May 1, 1962 H. S. CAMPBELL 3,032,365
DEVICE FOR ENGAGING AND RELEASING LOADS
Filed March 28, 1960 6 Sheets-Sheet 1

INVENTOR
HARRIS S. CAMPBELL
Raymond Wootton
ATTORNEY

May 1, 1962 H. S. CAMPBELL 3,032,365
DEVICE FOR ENGAGING AND RELEASING LOADS
Filed March 28, 1960 6 Sheets-Sheet 2

INVENTOR
HARRIS S. CAMPBELL
ATTORNEY

May 1, 1962 H. S. CAMPBELL 3,032,365
DEVICE FOR ENGAGING AND RELEASING LOADS
Filed March 28, 1960 6 Sheets-Sheet 4
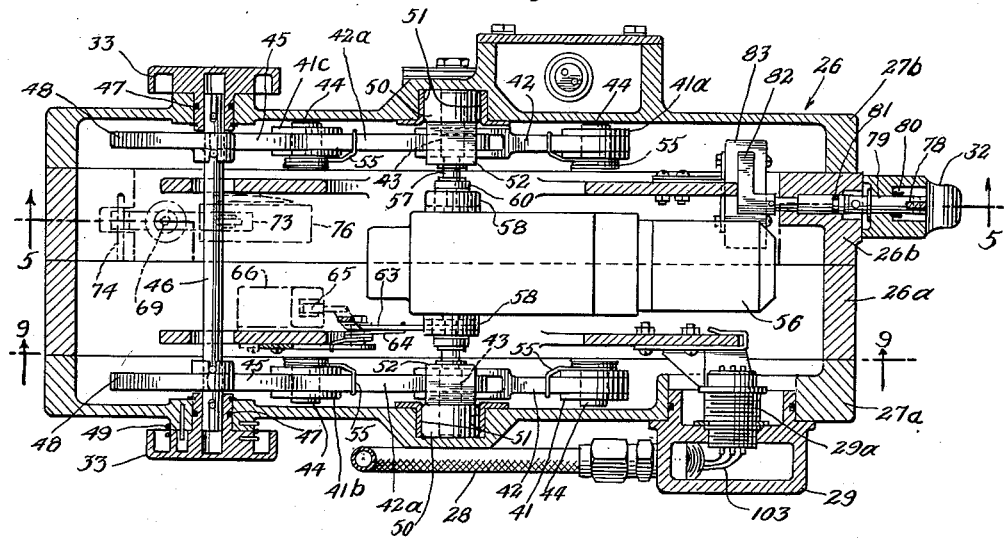
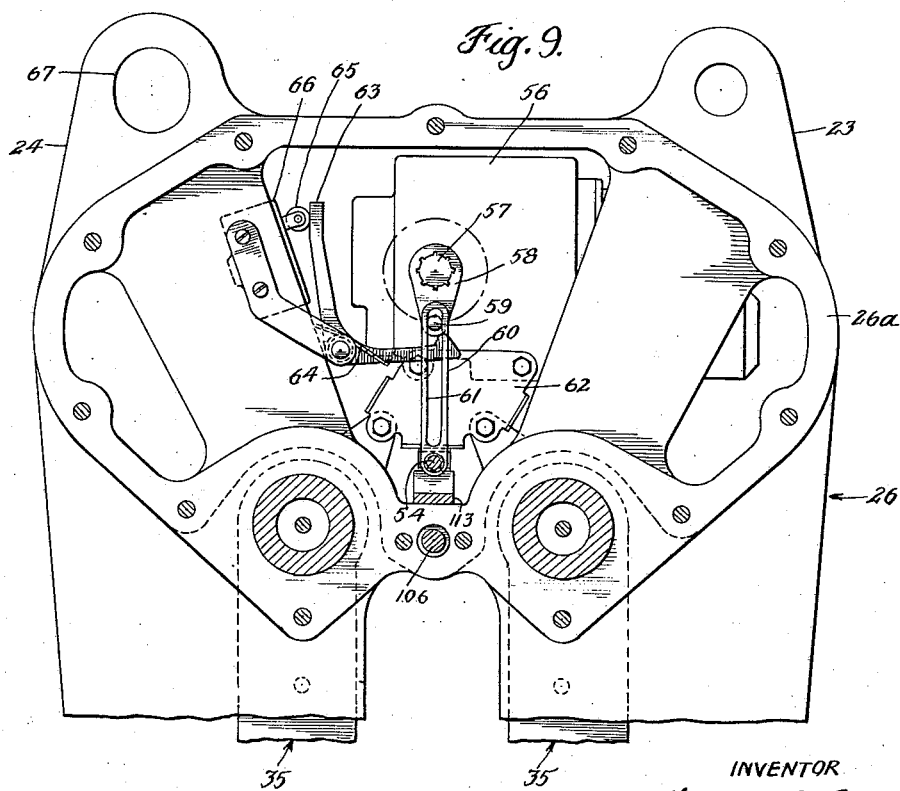
INVENTOR
HARRIS S. CAMPBELL
Raymond Woolten
ATTORNEY

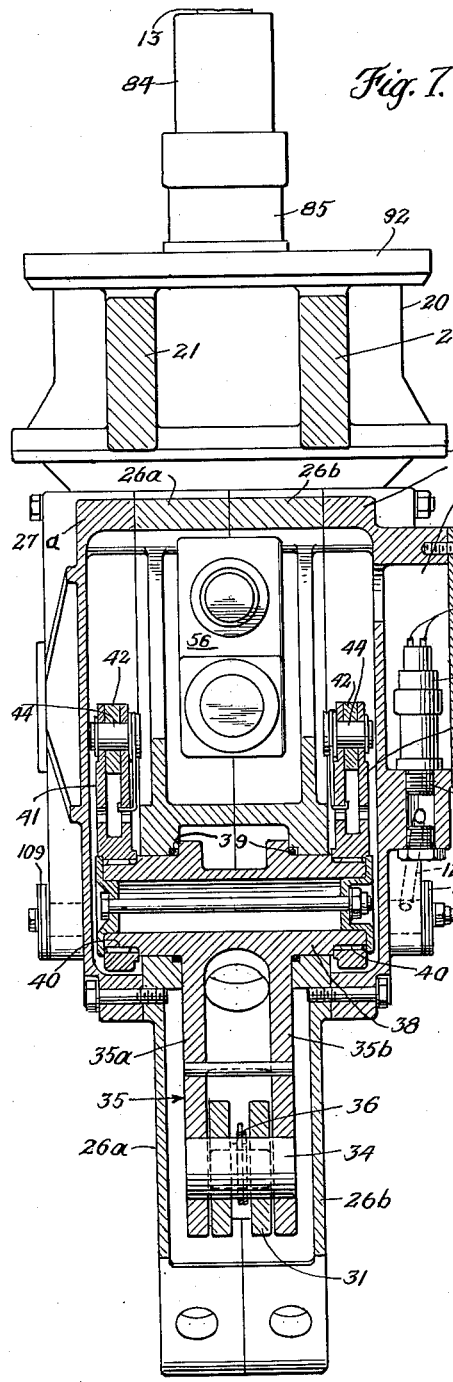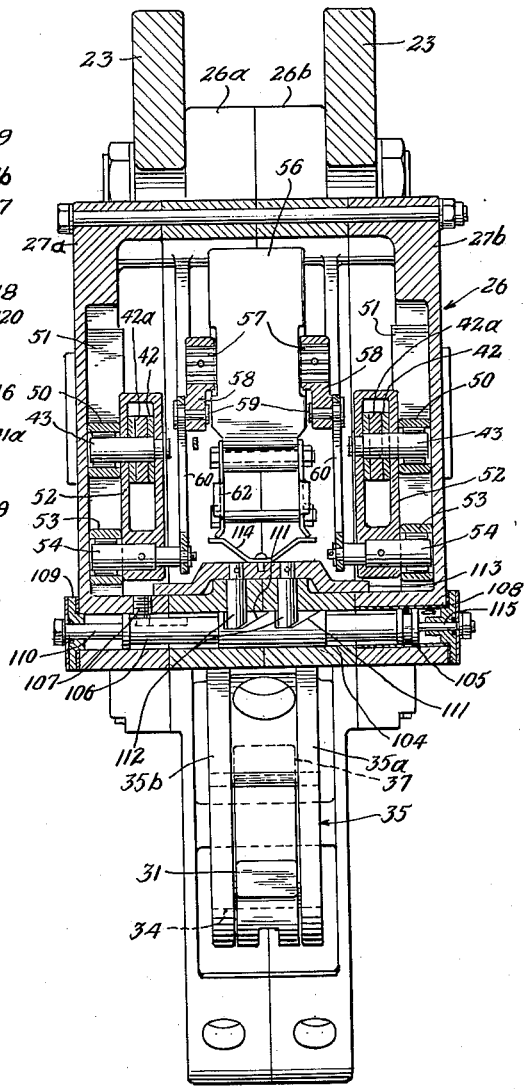

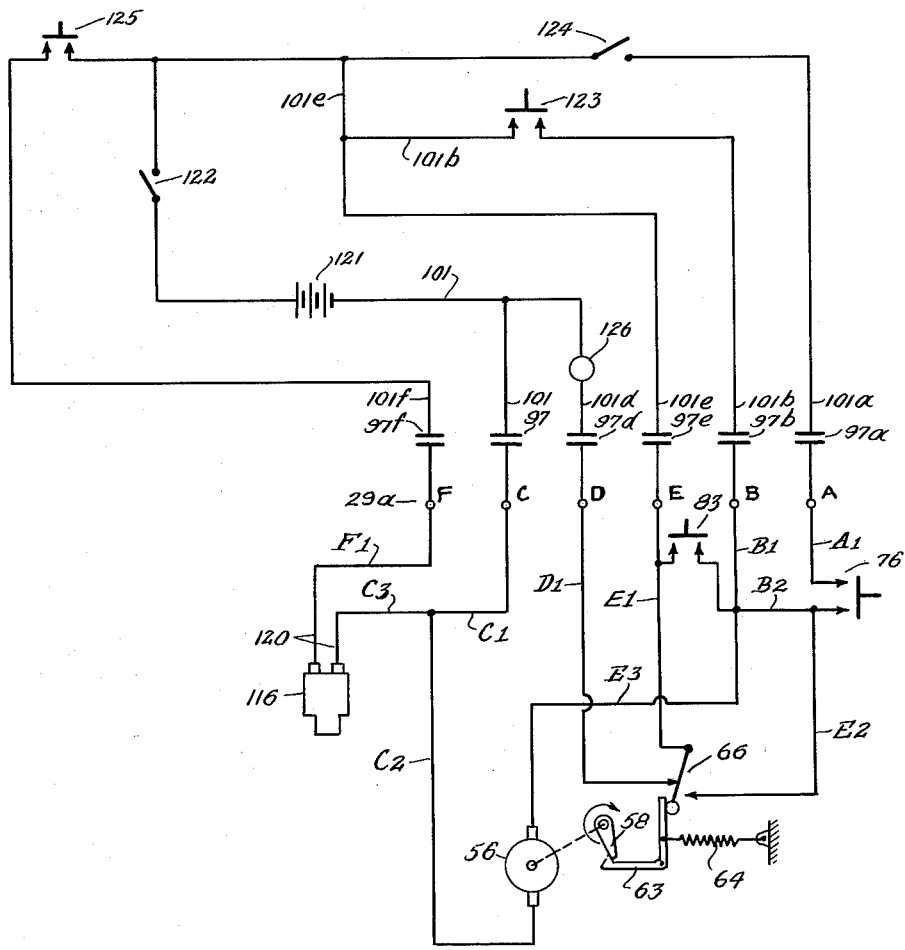

United States Patent Office 3,032,365
Patented May 1, 1962

3,032,365
DEVICE FOR ENGAGING AND RELEASING LOADS
Harris S. Campbell, Bryn Athyn, Pa., assignor to Eastern Rotorcraft Corporation, Doylestown, Pa., a corporation of Pennsylvania
Filed Mar. 28, 1960, Ser. No. 17,805
12 Claims. (Cl. 294—83)

This invention relates to release hook devices for engaging and releasing cargo supported in a slung position and is more particularly concerned with release devices suitable for remote control and power operation.

Devices of the type with which the present invention is concerned are particularly useful when used with helicopter type of aircraft in the lifting of external loads. In some instances it is desired to carry the load at the end of a cable which may be reeled in or out by a suitable winch. The release device herein described is well suited to operations of this nature and engagement with the sling ring which supports the load may be made by lowering the release device vertically to engage the ring or raising the ring vertically to engage the release unit.

It is one of the primary objects of the invention to provide a release hook mechanism which is self-loading by means of a vertical approach toward the load. Mechanism to accomplish this object is provided by a toggle beam construction which responds to upward forces to allow engagement of a supporting member but closes and supports the lifting member upon application of downward forces.

Another object of the present invention is the provision of actuating linkage associated with the load carrying means which when actuated to release the load moves the mechanism through a complete cycle opening the release and then closing it to position for receiving the next load.

A further object of the invention is the provision of remote control actuating mechanism which is adapted to provide operation by the operator within the cab of the crane unit and which also may be released by a crew member at the hook. This alternate operation is of particular value in situations where the flying crane is working in positions where the load cannot be observed from above such as when being deposited in wooded areas or in under water operations.

Another object of the invention is to provide for automatic touchdown release operation of the device at the will of the operator so that the load may be deposited automatically when the weight is removed.

An important object of the invention is to provide a remotely controllable release mechanism having the vital actuating parts suitably protected to allow operation of the device when submerged in water such as may be required in marine operations or salvage work. In accomplishing this object the housing structure may preferably be made in four main sections with relationship of parts to provide sealing of the actuating mechanism within the enclosed portion of the housing while allowing the load engaging portions to extend through the housing in a fashion to provide suitable mechanical transmission between sealed portion and the unsealed portion of the mechanism.

A still further object of the invention is to provide a twin toggle holding mechanism having a guide device to restrict the toggle movement to maintain symmetrical operation.

In remote control devices of this nature it is desirable to provide a second or emergency system of operation to permit the operator to disengage the load in the event of malfunction of the normal releasing system. It is a further object of the present invention to provide a pressure operated piston mechanism powered by an electrically fired explosive cartridge, the mechanism being compatible with the toggle mechanism used for the primary operating system.

How the foregoing objects and advantages as well as others incidental to the present invention are attained will be clear from the following description of the drawings in which—

FIGURE 6 is a transverse sectional view taken along lines 6—6, FIGURE 5.

FIGURE 7 is a vertical sectional view taken generally along the lines 7—7, FIGURE 5.

FIGURE 8 is a vertical sectional view taken along the line 8—8, FIGURE 5.

FIGURE 9 is a sectional view of the device taken in the direction of arrows 9—9, FIGURE 6.

FIGURE 10 is an electrical wiring diagram showing the electrical control system for the device.

Figure 1:
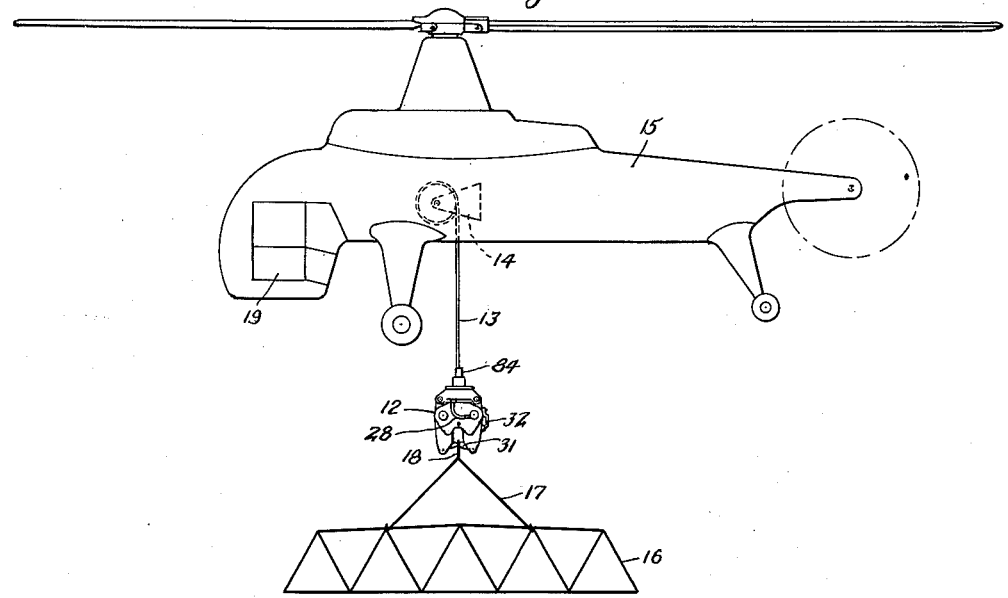
FIGURE 1 is a side elevational view illustrating the application of the device of the present invention for use with a crane type helicopter.

Referring to the figures, FIGURE 1 shows the cargo release hook device 12 attached by means of cable 13 and hoist winch 14 to the crane type helicopter 15. A load in the form of truss 16 is attached to the release device 12 by means of a sling 17 having connecting ring 18. The helicopter 15 is illustrated as having an operator's compartment 19 wherein the operator may observe the load being carried at all times and thus control the positioning of the helicopter, the degree of cable extension and the releasing operation of the cargo hook device.

In the example of cargo release mechanism illustrated in the figures the operation and control of the mechanism is by means of electrical energy, the conductors therefor being located in the main lifting cable 13 and extended downwardly therethrough into the release device 12. When supported in this manner on a single cable it is desirable to include free swiveling mechanism in the release hook and this is enclosed in the housing 20, FIGURE 2. The swiveling mechanism is connected to the main body of the cargo release device by means of lugs 21 and 22 which are attached to corresponding lugs 23 and 24 by means of suitable bolts 25. The main housing 26 incorporates center section parts 26a and 26b constituting a structural frame and a front cover housing 27a and rear cover 27b to completely enclose the internal mechanism. A flexible hose 28 encloses the electrical connections to transfer them from the swivel housing 20 to the electrical connector cover 29 which provides access to multiple prong mated connector 29a. The main housing parts 26 have depending legs to form a slotted opening 30, the load carrying beams 31 being supported at its lower end. The slot 30 thus forms the aperture which receives the load sling ring 18. A handle 32 is attached to the housing to provide for easy positioning of the release unit 12 by a ground attendant and knobs 33 extend outside the cover housings 27a and 27b both front and rear to provide a means for manual release of the mechanism by the attendant. (See FIG. 6.)

Figure 3:
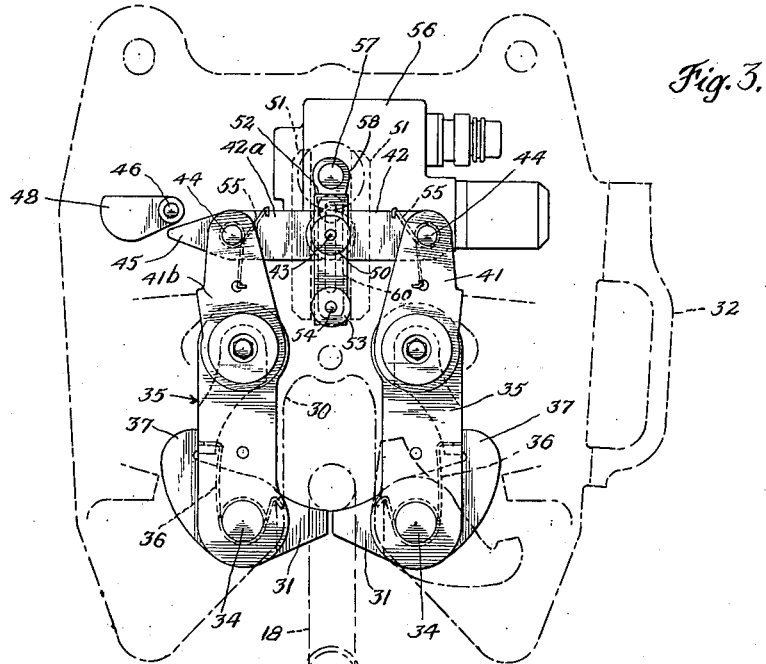
FIGURE 3 is an elevational view showing the housing in broken outline and illustrating the primary linkage and actuating mechanism in closed position.

The main supporting and releasing mechanism will be seen most clearly in FIGURES 3 to 7. In FIGURE 3 each toggle load beam 31 is shown supported by a pivot member 34 on a vertically disposed link structure 35.

From FIGURE 7 it will be seen that link structure 35 is composed of two legs 35a and 35b which support the load beam 31 between them. A spring 36 reacts between the link structure 35 and the supporting beam 31 to urge it to horizontal or load supporting position. In the load supporting position as indicated by full-line configuration in FIGURE 3 the beam 31 is equipped with an extension leg and limit stop portion 37 to restrain the beam 31 against downward movement when it is in its load supporting position. From FIGURE 7 it will be observed that the link legs 35a and 35b are integral at their upper ends with a transverse trunnion structure 38. As previously noted the main housing incorporates front and rear parts 26a and 26b constituting a structural frame. This construction allows the housing parts to be assembled over the ends of the trunnion 38. In this manner the link structure 35 is pivoted by the trunnion 38 in the main housing 26. Seals 39 are provided between the trunnion 38 and the housing structural frame parts 26a and 26b.

Figure 4:
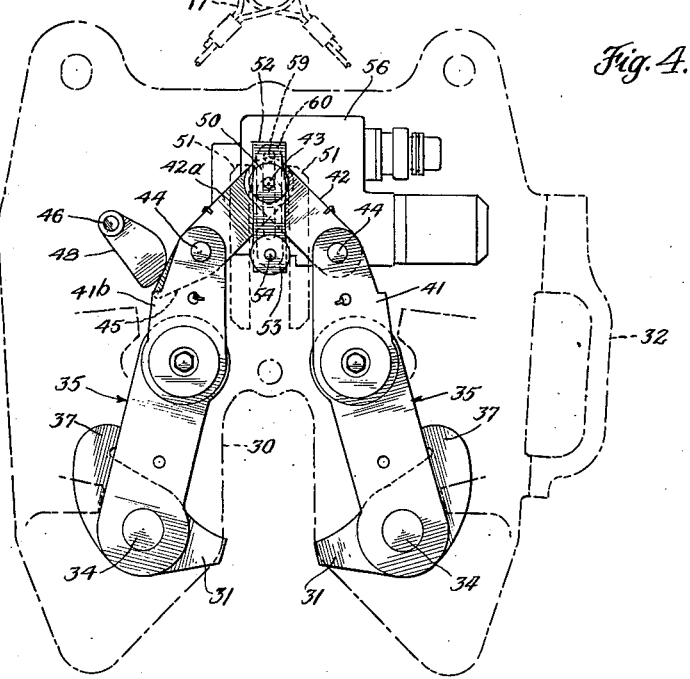
FIGURE 4 is a view similar to FIGURE 3 but illustrating the mechanism moved to open position.

A spline connection 40 at the ends of trunnion structure 38 provides for the attachment of the vertically extending arms or links 41 and 41a. Similar structure identified as arms or links 41b and 41c are shown connected to the left hand trunnion 38 (see FIG. 3). Toggle links 42 and 42a are connected together at the center by pivot 43 and connected to the upper ends of links 41 and 41b by means of pivots 44. Similar links 42 and 42a interconnect the rear upright arms 41a and 41c (see FIG. 6). From FIGURES 3 and 4 it will be observed that when the links 42 and 42a are in alignment the mechanism is locked against movement from forces applied in the downward direction at the load beams 31. When the center pivot 43 of the links 42 and 42a is displaced upwardly the toggle is released to permit the link structure 35 and the upright arms 41 and 41b to swing to a position such as shown in FIGURE 4 where the beam elements 31 are clear of the slot 30 and thus allow the load to be released. Return of the links 42 and 42a to the FIGURE 3 position resets the linkage for receiving another load.

Each link 42a is provided with an extension 45 which projects to the outside of the pivot 44. A shaft 46 (FIG. 6) extends through the housing and is connected for rotational movement with the knobs 33 at the outer side of the front housing 27a and the rear housing 27b. A seal 47 at each end of the shaft 46 prevents leakage into the case. Attached to the shaft 46 in alignment with the extensions 45 are cam members 48. The normal position of the cam 48 is shown in FIGURE 3 and to cause manual release of the hook mechanism the knobs 33 are rotated in a counterclockwise direction as viewed in FIGURES 3 and 4. Thus the cam may be rotated to the position shown in FIGURE 4 where it engages the extension 45 and forces the linkage into the disengaged position. A spring 49 returns the knobs 33 and cams 48 to the normal or hook engaged position.

In order to retain the linkage in proper relative position and cause it to move symmetrically the pivot 43 at the toggle center is extended to accommodate a guide roller 50 (FIG. 6). The housings 27a and 27b are equipped with guide tracks 51 in which the rollers 50 are positioned so that when they move in response to the opening action of the release hook they are guided along the vertical centerline to give symmetrical motion. To provide the proper location for the connection of the power actuating linkage for the movement of the toggle links 42, 42a, etc. a guide block or trolley member 52 is connected to links 41, 41b, etc. by means of pivots 43 (see FIG. 8). The block member 52 extends downwardly and supports a lower roller 53 by means of pivots 54. Rollers 53 are also guided by tracks 51.

Springs 55 are provided to return the linkage mechanism back to closed or load retaining position as shown in FIGURE 3. In the arrangement illustrated the normal opening of the mechanism under power release operation is accomplished by means of an electrical actuator 56. Actuator 56 includes an electric motor with suitable reduction gearing. The actuator 56 is provided with a transverse output shaft 57 the axis of which is parallel to toggle pivots 43. As will be noted in FIGURE 8 the shaft 57 extends out of both sides of the actuator 56 and on each end of the shaft 57 there is attached an arm 58. A pivot 59 at the end of arm 58 connects to link 60. The lower end of link 60 is connected to pivot 54 and thus by means of the block 52 is connected with the toggle links 42, 42a, etc. Each link 60 is provided with a long slot 61 so that the linkage mechanism can be opened manually while the arm 58 remains stationary. It will be noted that brackets 62 are provided to support the actuator 56 on the housing 26a and 26b. When the actuator 56 is energized it causes rotation of the arm 58 in a counterclockwise direction as viewed in FIGURE 9. This rotation causes link 60 to lift the block structure 52 and thus the toggle links 42, 42a to move the linkage to the open position shown in FIGURE 4. Continued rotation of the arm 58 to make one complete revolution permits the linkage to again close under the influence of springs 55.

To cause energization of the actuator 56 the operator may press a button which directs electrical current to the actuator motor 56 and starts the movement of the arm 58. As soon as the actuator arm 58 has moved away from the end of bellcrank 63 (see FIG. 9) spring 64 causes the bellcrank 63 to rotate in a counterclockwise direction and apply pressure to roller 65 of switch 66 to close the switch 66 and thus provide a holding circuit for continuation of the application of power to the actuator 56. The operator may then release the push-button used to initiate operation of the actuator 56 and the actuator continues to operate until the arm 58 has made one complete revolution where it again depresses the end of the bellcrank 63 to open the switch 66 and thus interrupt the circuit to the actuator. In this way the actuator causes the mechanism to completely open and then return to closed position.

Figure 5:
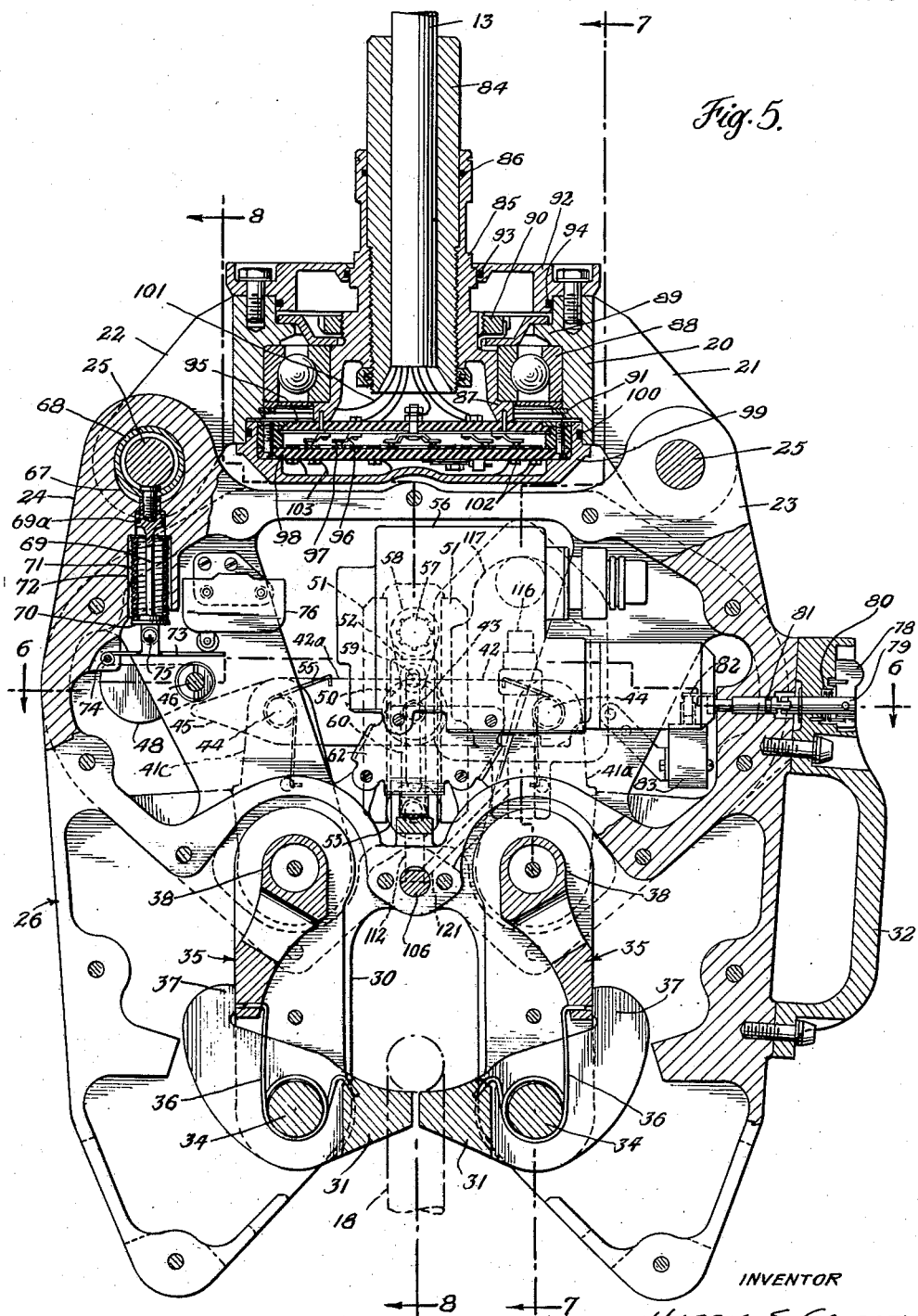
FIGURE 5 is a sectional view to an enlarged scale taken along the line 5—5 of FIGURE 6.

The release hook also incorporates mechanism for automatic release of the load when the load is placed on the ground. This mechanism is clearly shown in FIGURE 5. The lugs 24 are supplied with elongated apertures 67 in which is mounted a sleeve 68 which in turn is supported on bolt 25 which extends to the outer lugs 22. Attached to sleeve 68 is a special rod member 69 which has a seal 69a at its upper end and which has on its lower end a flange 70 to support a compression spring 71. The upper end of the compression spring 71 reacts against the end of cylindrical cavity 72 and the capacity of the spring is such that it can support the weight of the release hook when there is no weight being carried on the supporting beams 31. As shown in FIGURE 5 the lugs 24 are shown pulled down against the upper side of the sleeve 68 such as would be the case when a load is being carried on the ring 18 in the support beams 31. When this load is removed the spring 71 will raise the release hook so that the lower edge of the aperture 67 moves up against the sleeve 68. This slight shift of the housing with respect to rod 69 causes a relative movement of an arm 73 which is pivoted to the housing 26 at 74 and connected to the rod 69 by pin 75. The relative movement of the arm 73 causes movement of the switch 76 to close it. Then if the arming switch in the operator's compartment has been closed in anticipation of a touchdown release the switch 76 energizes the circuit to initiate operation of the actuator 56. The actuator will continue to cycle until the operator opens the arming switch and the actuator arm 58 has reached its bottom position to open switch 66. The arming switch is preferably opened immediately after the touchdown release is accomplished.

In order to provide the ground operator with power means for opening the release an additional control switch is provided. An actuating arm 78 at the upper end of the handle 32 is attached to a shaft 79 which extends into the inside of the housing. A spring 80 causes the switch arm 78 to return after it has been displaced by the operator. A seal 81 around the shaft 79 insures against leakage. The inner end of the shaft 79 has an arm 82 attached to it (see also FIG. 6). Arm 82 contacts the actuator roller of switch 83 to provide for initiation of the operation of the actuator 56. After the switch 83 has been closed for one second approximately the holding circuit supplied through switch 66 takes over and the operator may release the actuator arm 78. This rotational shaft actuator provides a switch control which is not affected by variations in external pressures such as would occur in under water operations.

The swiveling structure and the connection for attaching the release hook to the end of the supporting cable is illustrated most clearly in FIGURE 5. Here the supporting cable 13 is shown swaged to terminal 84 in a fashion which provides a waterproof connection between the two parts. Terminal 84 is threaded at the lower end to provide for the connection to the swivel fitting 85. A sealing ring 86 reacts between the terminal 84 and the fitting 85. The fitting 85 is provided at its lower end with a flange 87 to engage the ball bearing 88 which transfers the thrust load while permitting the swiveling action. The outer race of bearing 88 is supported in the swivel housing 20 by means of flange 89. Retention nut 90 and snap ring 91 provide against thrust displacement of the bearing 88 in the reverse direction to the main load. Upper cover 92 is attached to the swivel housing 20 by suitable bolts and rings 93 and 94 provide for sealing.

The electrical wires for supplying the current and control to the hook are preferably located at the center of the supporting cable 13 and the transfer across the swiveling connection is made by a slip ring assembly. The upper plate 95 of the slip ring is made from a suitable plastic or other non-conducting material and is attached for rotation with the swivel fitting 85. Moving contacts 96 are attached to the upper plate 95 and these are located so that they engage the slip rings 97 which are attached to the upper surface of the lower plate 98. It will be noted that the lower slip ring plate 98 is attached to the bottom cover 99 which is attached to the swivel housing 20, ring 100 being used to seal between the lower plate and the housing.

Figure 2:
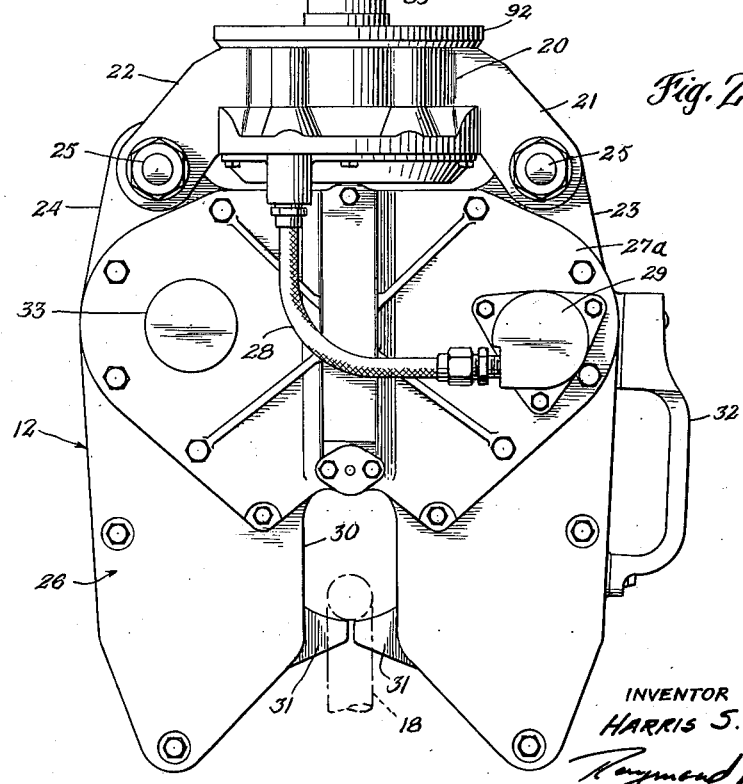
FIGURE 2 shows a front elevational view of a cargo release device according to the present invention.

Each conductor 101 is connected to at least one of the contacts 96. In some cases it may be desirable to provide multiple moving contacts on each of the rings 97 in order to increase reliability. Suitable connecting nuts 102 which are in electrical contact with a corresponding slip ring 97 are provided for extending the electrical connector wires 103 into the release hook proper. These connector wires are carried through the external waterproof hose coupling 28 as illustrated in FIGURE 2. The wire connections have been omitted from the main release hook structure shown in FIGURES 5 to 9 inclusive to prevent confusion. The proper wiring and connections to the various parts of the system will be clear from the diagram in FIGURE 10 where the various switches and electrically operated pieces of equipment are identified in a manner which will permit them to be readily related to the actual structure shown in FIGURES 5 to 9.

Emergency release mechanism is provided to take care of situations where the electrical circuit to the actuator may be disrupted or where the actuator mechanism may be inoperative. This mechanism for emergency release is best shown in FIGURE 8. A cylindrical opening 104 extends transversely at the lower end of the enclosed housing structure consisting of center housings 26a and 26b and outer housings 27a and 27b. A piston device 105 having a long rod 106 is supported in the cylindrical opening 104. A set screw 107 which engages a suitable slot in the rod 106 controls the longitudinal movement of the piston rod 106. Suitable cover plates 108 and 109 are provided at each end of the cylindrical opening 104 and equipped with suitable seals to prevent leakage into the release unit. A smaller rod portion 110 will be pushed outside the release unit when the piston is moved under emergency operation. This projecting part 110 acts as an indicator to show that the emergency release has been operated and the parts must be reset.

The center portion of the rod 106 is provided with a pair of notches having inclined planes 111. When the rod is moved under pressure applied to the piston cylindrical columns 112 are moved upwardly because of the inclined portions of the notches 111. Columns 112 are attached to the beam member 113 the ends of which when moved upwardly contact the lower ends of the blocks 52 and force them upwardly by an amount sufficient to release the toggle members about their pivot 43 so that the toggles 42, 42a will no longer hold the load on the beams 31 with the result that the mechanism opens to release the load. A spring 114 attached to the beam member 113 returns the beam member to lower position when the rod 106 is returned to its inoperative position. It will be noted that a slender rod portion 115 extending from the piston 105 withdraws from the opening in the cover 108 when the piston member 106 moves to its extreme position. In this position then a small vent hole is opened up from the piston chamber to permit the release of excess pressure after the end of the stroke has been reached.

To provide the pressure for operating piston 105 an explosive cartridge 116 (see FIG. 7) is provided. This cartridge 116 is mounted in a separate chamber 117 which may be reached for access from the outside by removing cover 118. This permits ready replacement of a new cartridge when needed after using the emergency release. The cartridge 116 is supported in place by means of threads 119 and electrical conductors 120 are provided for controlling the firing of the cartridge. When fired the gas pressure developed by the explosive is carried through a channel 121 which leads to the piston chamber so that the pressure will be applied to the end of piston 105.

The simplified electrical diagram in FIGURE 10 will illustrate the manner in which the operation of the release hook is accomplished. The portion of the diagram shown above the slip rings 97, 97a, etc. extends upwardly through the supporting cable 13 and into the aircraft by suitable conductors 101, 101a, etc. to provide the connection with the source of electrical energy for the various control operations. Thus the battery or other source of electrical energy is shown at 121. The master switch 122 controls the power to the complete hook circuit. The push switch 123 provides the operator's control for the normal release of the load. Arming switch 124 is closed when the operator wishes to effect automatic release of the load upon touchdown. Push switch 125 is used when the operator wishes to complete the circuit for the emergency release mechanism. Additional electrical details such as relays and slip rings for supplying the power to the cable reel have been omitted since these are not necessary for a full understanding of the operation of the cargo release hook device.

Points A, B, C, D, E and F on the diagram FIGURE 10 represent connector pins in the disconnect fitting 29a leading into the interior of the release hook mechanism. For operation of the hook the master switch 122 must first be closed. Then one of the poles of the battery 121 is connected by means of conductor 101, slip ring 97, connector C and conductors C1 and C2 to the actuator 56. To energize the actuator 56 to cause opening of the release hook in the manner previously described the operator may close push-button switch 123 which then connects the other pole of the battery 121 with the actuator 56 through conductor 101b, slip ring 97b, connector B and internal conductors B1 and E3. Completing the circuit to actuator 56 causes rotation of the actuator arm 58 in the direction of the arrow. As soon as arm 58 has moved sufficiently to clear the end of the bellcrank 63 the spring 64 causes closing of the switch 66 at which time the actuator becomes energized through connections E3, B2, E2, switch 66, E1, slip ring 97e and conductor 101e. The push switch 123 may then be released and the actuator continues to operate until a complete revolution of arm 58 has been made at which time the switch 66 opens to interrupt the circuit to the actuator so that it stops with the mechanism in the closed or load carrying position. Switch 66 has a normally closed position which makes contact to provide a connection through conductor D1, terminal D, slip ring 97d and conductor 101d to energize lamp 126 to give an indication that the release hook mechanism is in closed position.

In similar fashion the release mechanism may be opened by an operator moving the switch control arm 78 at the handle 32 to close switch 83. Closing switch 83 thus energizes the actuator 56 by means of conductor 101e, slip ring 97e, connector E, switch 83 and conductor E3. Again as soon as the actuator moves arm 58 away from bellcrank 63 the switch 66 energizes the holding circuit to continue the operation and cause complete opening and closing of the hook mechanism in the fashion described above.

In preparation for automatic release of the load upon touchdown the operator will close switch 124 in the operator's compartment. This arms circuit 101a so that when the touchdown switch 76 is closed by depositing the load carried by the release hook unit the circuit to the actuator 56 is completed through slip ring 97a, connector A, conductor A1, switch 76 and conductors B2 and E3. As soon as the actuator moves arm 58 the holding circuit again comes into play through switch 66 and rotates the arm 58. The automatic circuit will continue to remain energized until the operator opens the switch 124 to break the circuit through conductor 101a. Then as soon as the actuator has completed its next rotation to the point where switch 66 is opened the holding circuit is broken with the release mechanism in closed position ready to receive a load.

In case of failure of the actuator mechanism or the electrical circuits to the actuator the operator may push the emergency button 125 and this causes energization of the cartridge 116 through the circuit 101, slip ring 97, connector C, conductors C1 and C3 and return circuit conductor F1, connector F, slip ring 97f and conductor 101f. It will be obvious that the master switch 122 must be closed to complete the circuit to the explosive cartridge 116. Energization of the cartridge 116 causes operation of the piston 105 in the fashion previously described.

From the foregoing it will be evident that I have provided an improved cargo release device which is particularly suited for use with crane type helicopters or with other controlled load lifting operations using cable support. The release mechanism is also well suited to cargo release devices where vertical engaging movement is desired. The vertical support link pivoted in the mid-region to the housing and having toggle links to lock at the upper end and a tilting latch beam at the lower end provides a mechanism which allows automatic loading. This structure also permits transfer of movement from inner arms to outer arms through trunnions which can be sealed thus allowing a waterproof construction. The method of guiding the toggle links with multiple rollers allows locating the actuating mechanism to give a compact construction. The mechanism for emergency release utilizes in direct fashion the gas pressure developed by the explosive cartridge using a minimum number of parts.

I claim:

1. A cargo engaging and releasing device including a structural frame, mechanism having a pair of arm structures, a pivot located remote from the ends of each arm structure to attach to said frame, said arm structures having an outer end portion and an inner end portion, a cantilever beam part pivoted to each of said outer end portions, said beam parts extending toward each other, the ends of the cantilever beam parts thus substantially meeting each other, a position stop between each of said cantilever beam parts and the arm structure upon which it is pivoted, said stops preventing said cantilever beams from swinging outwardly with respect to the arm structures and allowing said beam parts to swing inwardly for inserting a load carrying element thereon, the inner end portion of each arm structure having a link member extending toward the inner end portion of the other arm structure, a pivot joining the link members together at a point midway between the ends of the arm structures to form a pair of toggle links which normally lie in substantially a dead center position to hold said arm structures in their closed position, and control means reacting with said toggle links to move them from dead center position to cause the outer portions of said arm structures and cantilever beam parts to move away from each other to release a load carrying element therefrom.

2. A cargo engaging and releasing device including a structural frame having a pair of extended legs at the lower side forming a space between them to accommodate a load carrying element, an arm structure pivoted on said frame and having a lower portion lying in one of said legs and an upper portion, a cantilever beam pivoted to the lower portion of said arm structure and extending transversely therefrom into the lower part of the space formed between said legs, a limit stop reacting between the lower portion of said arm structure and said beam, said stop being arranged to prevent downward movement of said beam with respect to said lower arm portion but to permit upward swinging of said beam with respect to said lower arm portion to allow entry of a load carrying element into the space between said legs, toggle links attached to the upper portion of said arm structure and positioned so that said links lie in substantially dead center relationship when said arm structure is in normal load carrying position, and a control attached to said links to cause movement thereof to swing the lower end of said arm structure and said cantilever beam away from said space thereby causing release of a load carrying element from said cantilever beam.

3. A cargo engaging and releasing device including a structural frame, a load carrying arm pivotally attached to said frame, a pair of toggle links pivotally connected to said arm and lying in substantially dead center relationship when said arm is in load carrying position, releasing mechanism having an electrical actuator unit incorporating a shaft rotatable through an arc of 360 degrees, a control arm attached to said shaft having its end in offset relation with respect to said shaft, an operating connection between the end of said arm and said toggle links to provide a complete releasing and closing cycle of movement of said load carrying arm during 360 degrees' rotation of said shaft, an electrical switch having an electrical connection to said actuator unit, an operating connection between said control arm and said switch to provide for opening of said switch to interrupt power to said actuator unit when said arm reaches the position corresponding to dead center relation of said toggle links.

4. A cargo engaging and releasing device including a structural frame, a pair of arm structures, each having a pivot member supporting it in said frame, said arm structures having parallel lower arm portions extending downwardly from said pivot, a cantilever beam part pivotally connected to the lower end of each of said lower arm portions, said cantilever parts extending toward each other transversely from said lower arm portions so that their ends substantially meet, each of said arm structures having upwardly extending arm parts, a pair of toggle links connected to said upwardly extending arm parts and pivotally connected to each other at the midposition between said upwardly extending arm parts, said frame having a guide channel structure therein extending on a line perpendicular to a line joining the arm structure pivots, a guide part engaging said channel structure and said toggle links, and a control member having an operative connection with said toggle links to cause movement of the toggle links away from their dead center position to move said arm structure to release position.

5. A cargo engaging and releasing device including a structural frame, mechanism having a pair of arm structures, a pivot located remote from the ends of each of said arm structures to attach each arm structure to said frame, each arm structure having an outer end portion and an inner end portion, a cantilever beam part pivoted to each of said outer end portions, said beam parts being extended transversely so the ends of the cantilever beam parts substantially meet each other, each of said cantilever beam parts having a stop which prevents it from moving downwardly with respect to the arm structure on which it is mounted, the inner end portions of the arm structure being connected by a pair of toggle links, said toggle links being pivoted together midway between the inner end portions of said arm structures, said toggle links normally lying in substantially dead center relation to retain said arm structures in their closed position, a power actuator unit having a control connection to said toggle links to move them out of dead center relation thereby causing swinging of the arm structures to move said cantilever beam parts so that their ends are separated for releasing a load.

6. A cargo engaging and releasing device including a structural frame, mechanism having a pair of arm structures, each of said arm structures having a pivot supporting it on said structural frame, the lower portion of each of said arm structures extending downwardly from said pivot in parallel relation to each other, a cantilever beam part pivoted to each of said arm structures at the lower end thereof for swinging movement upwardly from a position substantially perpendicular to said arm structures, said arm structures having an upper portion extending from its pivot, a pair of toggle links connecting the upper ends of said upper arm portions, said frame having a track extending vertically at its inside mid-section, a guide trolley part connected to said toggle links, said guide trolley part having a pair of rollers connected thereto and adapted to be guided in said track, one of said rollers being located below said toggle links, an actuating unit having a rotating shaft, an arm attached thereto, and a connecting link extending between the end of said arm and the lower end of said trolley part to move said toggle links away from dead center position to cause release of said cargo device.

7. A cargo engaging and releasing device including a structural frame having a portion constructed to form an enclosed housing, mechanism having a pair of trunnion members mounted in said frame, a pair of downwardly extending arm members connected to said trunnion members at their mid-region, cantilever beam members pivotally connected to the lower ends of said downwardly extending arm members, said trunnion members extending outwardly from said downwardly extending arm members through said structural frame, a sealing member encircling said trunnion members and supported in said frame at each point where a trunnion member passes through said frame, an upwardly extending arm member attached to the end of said trunnion member after it has passed through said frame, a pair of toggle links extending between the upper ends of said upper arms, said toggle links lying in dead center relationship when the mechanism is in engaging position, a cover part forming part of said frame enclosing said upper arms and said toggle links, an actuator unit supported on said frame inside said cover part, and operating connections between said actuator unit and said toggle links to provide for movement of said toggle links away from dead center position upon movement of said actuator unit.

8. A cargo engaging and releasing device including a structural frame having a plurality of sections, a pair of downwardly extending arms having a pivot member connected thereto and extending therefrom at each side, said frame having wall portions with apertures to fit said pivot members, two sections of said frame being shaped to fit together with the ends of said pivot members extending through, a pair of upwardly extending arm members connected to the ends of the pivot members which extend through said frame, said arm members thus forming two opposed pairs, a pair of toggle links extending between one of said opposed pairs of arm members and another pair of toggle links extending between the other of said opposed pairs of arm members, a cover plate at each side of said frame to complete the enclosure of said upwardly extending arms and said toggle links, said cover plates having vertical guides on their inner surfaces, pivot structure joining each pair of toggle links at their centrally located ends, each of said pivot structures also engaging one of said vertical guides, a powered actuating unit mounted in said frame within said covers and having an operating connection to each pair of toggle links to cause movement thereof for releasing the cargo device.

9. A cargo engaging and releasing device including a structure frame, mechanism for engaging and disengaging cargo supported on said frame, said mechanism having a pair of arm structures pivotally supported between their ends, the lower ends of said arm structures having pivoted beam parts attached thereto, the upper ends of said arm structures being connected by a pair of toggle links normally lying near dead center position, actuating mechanism for moving said toggle links from their dead center position to cause release of the cargo device, said actuating mechanism having a cylinder, a piston mounted therein, operating connections between said piston and toggle links, and a fluid channel leading to said cylinder.

10. A cargo engaging and releasing device including a structural frame, a load supporting member pivotally mounted on said frame, said load supporting member having arms extending downwardly and upwardly from the pivotal mounting, a load engaging beam pivotally monuted on said downwardly extending arm, retention linkage connected to the upwardly extending arm of said load supporting member, actuating mechanism for moving said retention linkage, said actuating mechanism having a cylinder supported in said frame, a piston in said cylinder, operating connections between said piston and said retention linkage, a fluid channel leading to said cylinder and a source of pressure fluid controllably connected to said fluid channel.

11. A cargo engaging and releasing device including a structural frame, an arm structure pivotally mounted on said frame, said arm structure having a lower portion, a cantilever load engaging beam mounted on said lower portion, said arm structure having an upper portion, a pair of toggle links connected to said upper portion of said arm structure, said toggle links lying in substantially dead center position when holding the arm structure in load engaging position, actuating mechanism for moving said toggle links from dead center position to cause release of said load engaging beam, said actuating mechanism having a cylinder on said frame, a piston in said cylinder, a rod member connected to said piston, said rod member having an inclined surface in a portion thereof, another rod member engaging the inclined surface, the motion of said piston being transferred to the rod members to cause movement of said toggle links, and a channel leading to said cylinder for transferring pressure fluid.

12. A cargo lifting and releasing device having a combination frame and housing unit formed with four main parts, a load supporting arm member having a pair of pivot trunnions, one extending from each side thereof, two of the frame parts having circular apertures adapted to support the pivot trunnions, said frame parts being assembled to engage each other with the pivot trunnions extending through the apertures, sealing elements supported in said frame parts adjacent said apertures and engaging said pivot trunnions, the ends of said trunnions extending through said apertures, an arm attached to the end of each of said trunnions, operating linkage connected to said arms, an actuator device mounted on said frame and housing unit and having an operative connection to said linkage, two cover parts forming the other main parts of said frame and housing unit, said cover parts enclosing said arms, operating linkage and actuator device and being fastened to the sides of the first two frame parts which support said pivot trunnions.

References Cited in the file of this patent

UNITED STATES PATENTS

| | | |
|---|---|---|
| 2,476,734 | Jellison | July 19, 1948 |
| 2,613,101 | Roberson | Oct. 7, 1952 |
| 2,664,175 | Hertel et al. | Dec. 29, 1953 |
| 2,852,982 | Musser | Sept. 23, 1958 |